United States Patent
Saeki et al.

(10) Patent No.: US 10,365,087 B2
(45) Date of Patent: Jul. 30, 2019

(54) ORTHOGONAL STATE MEASURING DEVICE

(71) Applicant: MITUTOYO CORPORATION, Kanagawa (JP)

(72) Inventors: Takeshi Saeki, Kawasaki (JP); Hiroshi Sakai, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 776 days.

(21) Appl. No.: 14/091,915

(22) Filed: Nov. 27, 2013

(65) Prior Publication Data

US 2014/0152805 A1 Jun. 5, 2014

(30) Foreign Application Priority Data

Nov. 30, 2012 (JP) .................................. 2012-263663

(51) Int. Cl.
*G01B 11/14* (2006.01)
*H04N 7/18* (2006.01)
(Continued)

(52) U.S. Cl.
CPC ............ *G01B 11/14* (2013.01); *G01B 11/005* (2013.01); *G01B 21/047* (2013.01); *H04N 7/18* (2013.01)

(58) Field of Classification Search
CPC .................................................... G01B 11/14
(Continued)

(56) References Cited

U.S. PATENT DOCUMENTS

2003/0160757 A1\* 8/2003 Shirai ...................... G01C 1/04
345/156
2004/0109205 A1\* 6/2004 Asano .................. G01B 11/306
358/448

(Continued)

FOREIGN PATENT DOCUMENTS

EP 1059609 12/2000
GB 2194367 3/1988
(Continued)

OTHER PUBLICATIONS

Wang L et al., "A vision-aided alignment datum system for coordinate measuring machines", Measurement Science and Technology, IOP, Bristol, GB, vol. 8, No. 7, XP020064273 , Jul. 1, 1997, pp. 707-714.

(Continued)

*Primary Examiner* — Yulin Sun
(74) *Attorney, Agent, or Firm* — Greenblum & Bernstein, P.L.C.

(57) ABSTRACT

An orthogonal state measuring device includes a measurement table and a CCD camera displacing in X, Y, and Z directions relative to the measurement table and measuring a work piece placed on the measurement table. The orthogonal state measuring device further includes a wide angle surveillance camera, a computer main body, and a display. The wide angle surveillance camera captures in one pass an image that is capable of configuring a bird's-eye image of the work piece, the bird's-eye image encompassing an entire field over which the CCD camera is capable of relative displacement. The computer main body generates the bird's-eye image based on the image and defines a position of the CCD camera on the bird's-eye image, then configures navigation maps in which the position of the CCD camera is (Continued)

composited on the bird's-eye image. The display displays the navigation maps.

11 Claims, 6 Drawing Sheets

(51) Int. Cl.
  *G01B 21/04* (2006.01)
  *G01B 11/00* (2006.01)
(58) Field of Classification Search
  USPC .......................................................... 348/94
  See application file for complete search history.

(56) References Cited

U.S. PATENT DOCUMENTS

2004/0130501 A1* 7/2004 Kondo ............. H04N 21/21805
                                                       345/1.1
2012/0027307 A1    2/2012 Naruse

FOREIGN PATENT DOCUMENTS

| JP | 2003-227706 | 8/2003 |
| JP | 2006-038683 | 2/2006 |
| JP | 2008-209420 | 9/2008 |

OTHER PUBLICATIONS

Search report from E.P.O. (EP Appl. No. 13005545.2), dated Mar. 21, 2014.

* cited by examiner

Imab

Fig. 10B

Imt

ORTHOGONAL STATE MEASURING DEVICE

CROSS-REFERENCE TO RELATED APPLICATIONS

The present application claims priority under 35 U.S.C. § 119 of Japanese Application No. 2012-263663, filed on Nov. 30, 2012, the disclosure of which is expressly incorporated by reference herein in its entirety.

BACKGROUND OF THE INVENTION

1. Field of the Invention

The present invention relates to an orthogonal state measuring device, which collectively refers to an image measuring device displacing a charge coupled device (CCD) camera in X, Y, and Z directions to measure a work piece, a coordinate profile measuring apparatus displacing a touch probe in the X, Y, and Z directions to measure the work piece, and the like. In particular, the present invention relates to an orthogonal state measuring device capable of ensuring safe operation of a stylus head and improving operability by enabling intuitive understanding of a position of the stylus head with respect to the work piece.

2. Description of Related Art

Conventionally, an orthogonal state measuring device is known that includes a measurement table and a CCD camera (stylus head) displacing relative to the measurement table in the X, Y, and Z directions and measuring a work piece placed on the measurement table (Japanese Patent Laid-open Publication No. 2003-227706). In the orthogonal state measuring device of this kind, when the CCD camera is displaced quickly, care is required to avoid collisions between the work piece and the CCD camera. Typically, an obstruction check is performed using computer-aided design (CAD) data, or design data of the work piece is used to prevent a collision between the work piece and the CCD camera.

However, even when the design data of the work piece is used, actual placement or dimensions of the work piece may differ from the design data. In such a case, there is still concern that a collision may occur between the work piece and the CCD camera even when using the design data. For this reason, in order to avoid such collisions with certainty, an operator of the orthogonal state measuring device shifts his or her line of sight from a display displaying information such as a measurement status or results to the actual CCD camera and displaces the CCD camera so as to avoid obstacles by focusing on a relationship between the work piece and the CCD camera and confirming a status of an area around the CCD camera. In other words, the larger the orthogonal state measuring device becomes, the further the CCD camera becomes from a location of the operator, and thus the more strenuous the practice required for operation of the device. At the same time, such operation becomes a large psychological burden on the operator, which may result in decreased operability.

SUMMARY OF THE INVENTION

The present invention is conceived in order to resolve the above issues and provides an orthogonal state measuring device capable of ensuring safe operation of a stylus head and of improving operability by enabling intuitive understanding of a position of the stylus head with respect to a work piece.

An aspect of the present invention is an orthogonal state measuring device that includes a measurement table and a stylus head displacing in X, Y, and Z directions relative to the measurement table and measuring a work piece placed on the measurement table. The orthogonal state measuring device includes a wide angle surveillance camera, a processor, and a display. The wide angle surveillance camera captures in one pass an image that is capable of configuring a bird's-eye image of the work piece, the bird's-eye image encompassing an entire field over which the stylus head is capable of relative displacement. The processor generates the bird's-eye image based on the image and defines a position of the stylus head on the bird's-eye image, then configures a navigation map in which the position of the stylus head is composited on the bird's-eye image. The display displays the navigation map.

Another aspect of the present invention has CAD data (which may include a CAD image) of the work piece composited on the navigation map.

Another aspect of the present invention has a region where measurement of the work piece by the stylus head is complete composited on the navigation map.

According to the present invention, safe operation of a stylus head can be ensured and operability can be improved by enabling intuitive understanding of a position of the stylus head with respect to a work piece.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an exemplary embodiment of the present invention is described in detail with reference to the drawings.

Figure 1:
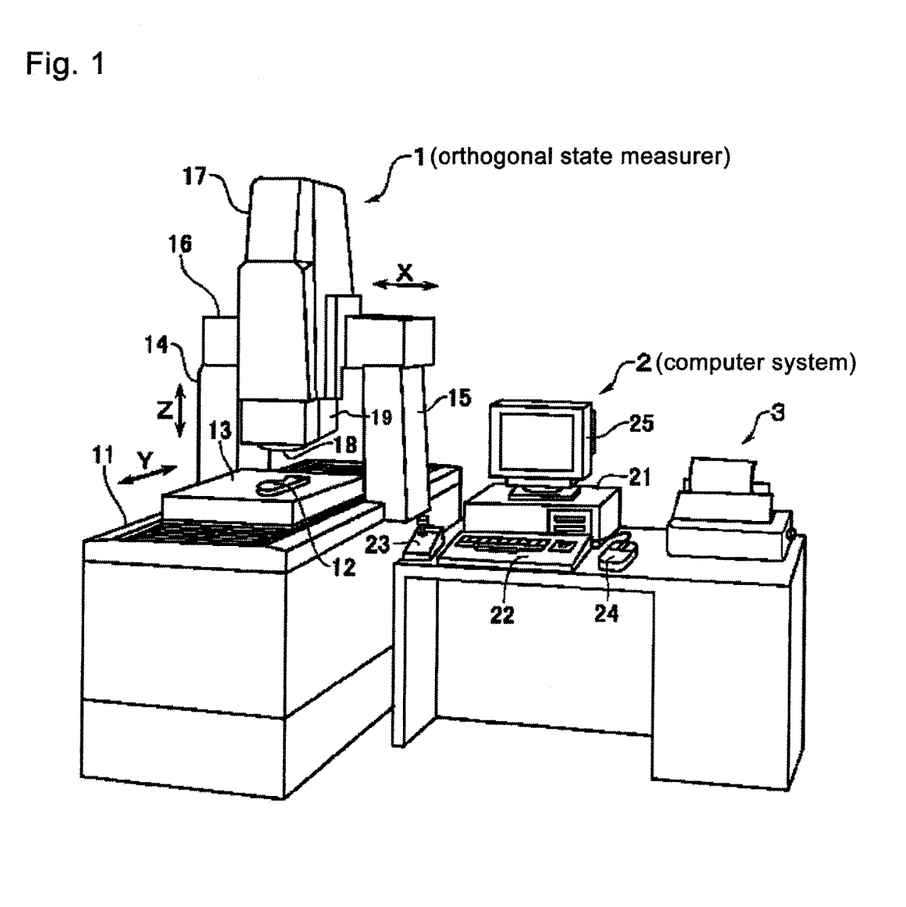
FIG. 1 is a schematic diagram of an orthogonal state measuring device according to a first embodiment of the present invention.
Figure 2:
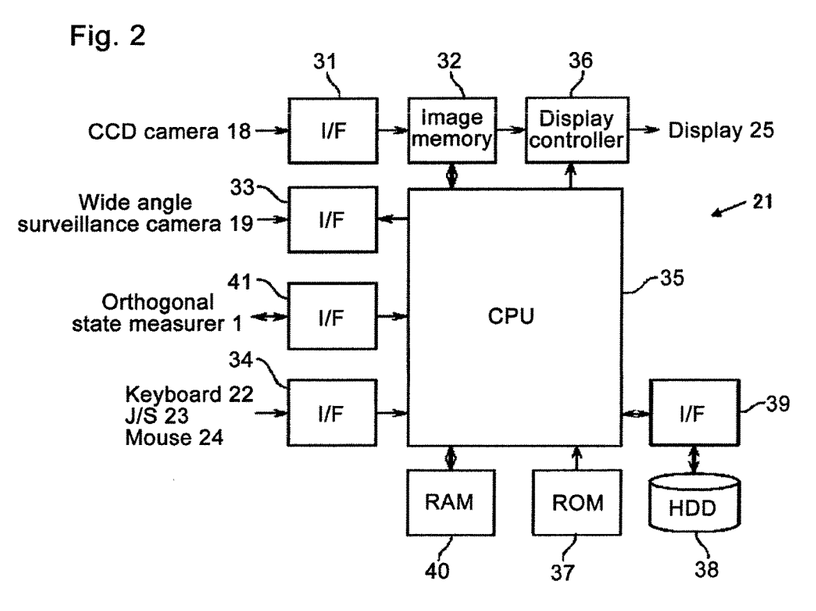
FIG. 2 is a block diagram illustrating a configuration of a computer system of the orthogonal state measuring device.

Initially, a configuration of an orthogonal state measuring device according to an embodiment is described chiefly with reference to FIGS. 1 and 2.

The orthogonal state measuring device includes a non-contact-type orthogonal state measurer 1; a computer system 2 controlling the orthogonal state measurer 1 and executing required data processing; and a printer 3 printing out measurement results and the like.

As shown in FIG. 1, a measurement table 13 is mounted on the orthogonal state measurer 1, a work piece 12 being placed on a stage 11 of the measurement table 13. In addition, the measurement table 13 is driven in a Y-axis direction by a Y-axis drive mechanism (not shown in the drawings). Two support arms 14 and 15, extending upward, are fixated in center portions of two lateral edges of the stage 11. An X-axis guide 16 is fixated thereto in a manner connecting top ends of both of the support arms 14 and 15. The X-axis guide 16 displaceably supports an image capture unit 17.

As shown in FIG. 1, the image capture unit 17 is driven along the X-axis guide 16 by an X-axis drive mechanism (not shown in the drawings). A CCD camera 18 (stylus head) is mounted to a bottom end of the image capture unit 17 so as to oppose the measurement table 13. In addition to an illumination device and a focusing mechanism (neither shown in the drawings), a Z-axis drive mechanism is installed on an interior of the image capture unit 17, the Z-axis drive mechanism displacing a Z-axis direction position of the CCD camera 18. In this way, the CCD camera 18 is made capable of displacement in the X, Y, and Z directions relative to the measurement table 13. Moreover, each of the X-, Y-, and Z-axis drive mechanisms are configured with a pulse motor, for example, the drive of which is controlled by the computer system 2, described hereafter. Thereby, coordinate information can be appended to measurement image data obtained from the CCD camera 18. Specifically, the CCD camera 18 measures the work piece 12 placed on the measurement table 13, obtains a measurement image Imm (see FIG. 5), and outputs the measurement image data. A wide angle surveillance camera 19 is also installed with the CCD camera 18.

Figure 3:
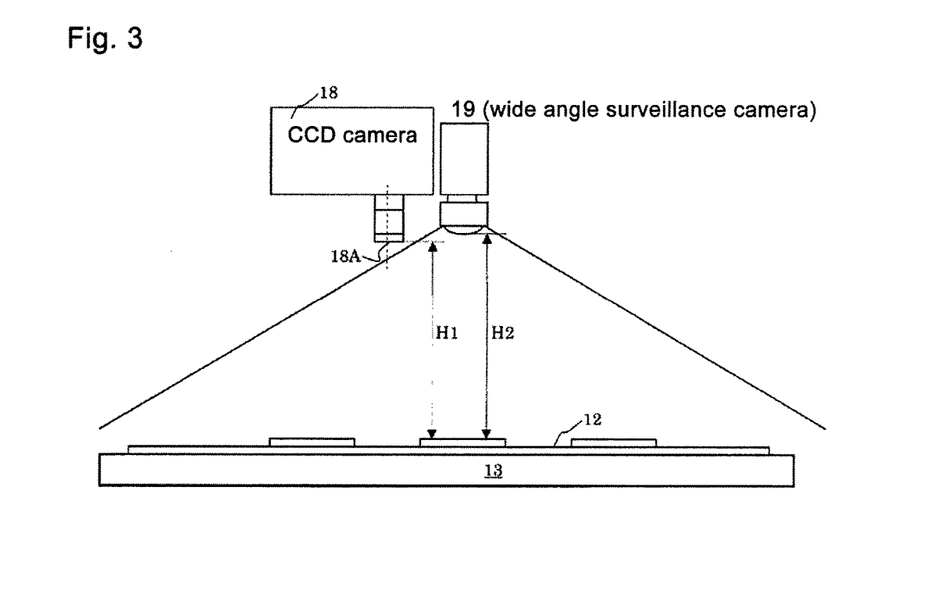
FIG. 3 is a schematic diagram illustrating an exemplary field of view of a wide angle surveillance camera of the orthogonal state measuring device.
Figure 4A:
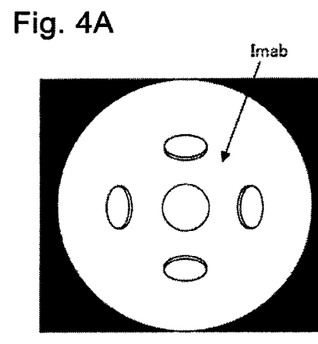
FIGS. 4A and 4B are schematic diagrams describing aberration correction performed in a processor of the orthogonal state measuring device.

As shown in FIGS. 1 and 3, the wide angle surveillance camera 19 is capable of displacement along with the CCD camera 18, and is also capable of capturing in one pass an image that is capable of configuring a bird's-eye image Imt (see FIG. 4B) of the work piece 12, the image encompassing an entire field over which the CCD camera 18 is capable of relative displacement. Specifically, the wide angle surveillance camera 19 includes a super wide-angle lens (including a fish-eye lens) and has a short focus distance (i.e., a focus distance of less than 24 mm) and a wide field angle (i.e., a field angle of 90 degrees or more; however, the field angle may be 180 degrees or more). Thus, as shown in FIG. 4A, a total image Imab captured by the wide angle surveillance camera 19 is an image with an extremely wide field, but a large aberration (distortion). The wide angle surveillance camera 19 outputs the total image Imab as total image data. Moreover, the wide angle surveillance camera 19 is positioned so as to not protrude toward the work piece 12 more than the CCD camera 18 (H2<H1), as shown in FIG. 3.

The computer system 2 is configured to include a computer main body 21 (processor), a keyboard 22, a joystick box (indicated in the drawings as J/S) 23, a mouse 24 (collectively, an inputter), and a display 25 (display).

As shown in FIG. 2, the computer main body 21 includes interfaces (indicated in the drawings as I/F) 31, 33, 34, 39, and 41; an image memory 32; a display controller 36; a ROM 37; an HDD 38; and a RAM 40. The measured image data of the work piece 12 input from the CCD camera 18 is stored in the image memory 32, the HDD 38, or the RAM 40 via the interface 31. The total image data input from the wide angle surveillance camera 19 is input to the CPU 35 via the interface 33. In addition, the total image data is processed by the CPU 35 (navigation map processed), then stored in the image memory 32, the HDD 38, or the RAM 40 as navigation map data. As shown in FIG. 5, the navigation map data and the measured image data stored in the image memory 32, HDD 38, or RAM 40 are displayed as navigation maps Imn1 to Imn3 and the measurement image Imm, respectively, on a screen of the display 25 via the display controller 36.

As shown in FIG. 2, the keyboard 22, the joystick box 23, and the mouse 24 are connected to the CPU 35 via the interface 34. In other words, the keyboard 22, the joystick box 23, and the mouse 24 designate an element of the work piece 12 to be targeted and designate what measurement to perform there. In addition, the keyboard 22, the joystick box 23, and the mouse 24 designate to the display controller 36 what data to display and how to display the data.

The CPU 35 executes a measurement execution process and a calculation result display process according to a macroprogram (stored in the ROM 37) as well as a measurement program and a measurement result display program (which are stored in the RAM 40). For example, as the measurement execution process, the CPU 35 performs edge detection at a measurement location on the measurement image Imm designated by the keyboard 22, the joystick box 23, and the mouse 24, the edge detection being required to perform the designated type of measurement. The CPU 35 then obtains a point cloud as the detection results. Then, based on the point cloud, calculations corresponding to the designated type of measurement are performed and results of the calculation are obtained. In addition, a file is created that associates positional relationships of the navigation maps Imn1 to Imn3 and the measurement image Imm as well as the measurement location(s) of the measurement image Imm with the calculation results thereof. The file is then stored in the image memory 32, the HDD 38, or the RAM 40. Also, the CPU 35 can control the orthogonal state measurer 1 via the interface 41 according to the measurement execution process. Moreover, CAD data from a CAD system (not shown in the drawings) can be indexed to the measurement image Imm and the navigation maps Imn1 to Imn3, then stored in the image memory 32, the HDD 38, or the RAM 40. For example, design data, common difference data, or the like included in the CAD data can be extracted, indexed with the calculation results, and stored.

In addition to the CAD data input from the CAD system (not shown in the drawings), the HDD 38 stores a point cloud, a measurement program, a measurement result display program, and the like. In addition to storing the various kinds of programs, the RAM 40 provides a processing area for various kinds of data.

Next, a description is given for a navigation mapping process of the total image data performed by the CPU 35.

Figure 4B:
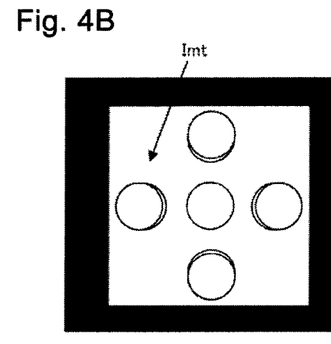
Figure 5A:
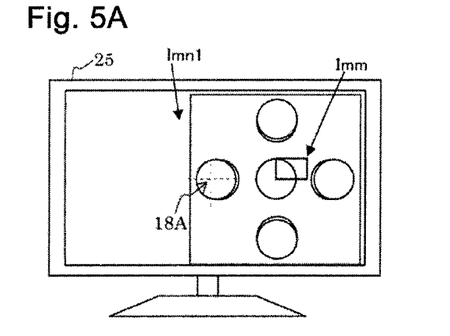
FIGS. 5A to 5D are schematic diagrams of exemplary images displayed on a display of the orthogonal state measuring device.
Figure 5B:
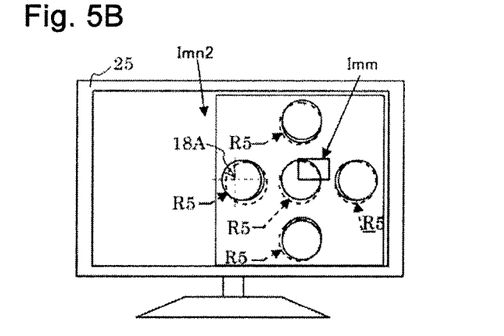
Figure 5C:
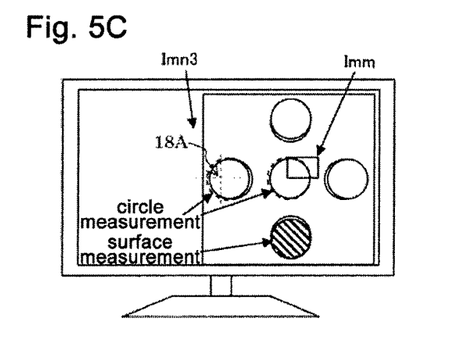
Figure 5D:
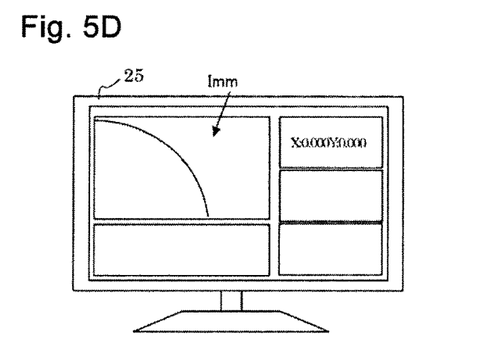

After the total image data input from the interface 33 is opened by the CPU 35 in bitmap image data, distortion correction is performed. Rough correction of the distortion is performed by coordinate substitution of a position of each pixel data configuring the total image data. For example, with a lattice pattern as a reference image, an image of the reference image is captured ahead of time with the wide angle surveillance camera 19 from a candidate virtual position. Then, a coordinate transformation coefficient (including a function as the coefficient) is obtained from the distorted reference image that was obtained, and the coordinate transformation coefficient is stored in the RAM 40. Then, when the total image data actually showing the total image Imab, as shown in FIG. 4A, is input to the CPU 35 via the interface 33, the coordinate transformation coefficient is read from the RAM 40 to the CPU 35 and a coordinate transform is performed on the total image data. At that point, pixel interpolation is also performed as needed. As a result, the bird's-eye image Imt is generated in which a three-dimensional shape of the work piece 12 can be discerned, the three-dimensional shape being viewed from above from the virtual position and being aberration corrected from the total image data, as shown in FIG. 4B. At that time, a position 18A of the CCD camera 18 in the bird's-eye image Imt is defined from a signal output to the interface 41. Therefore, the navigation map Imn1 shown in FIG. 5A is configured in the CPU 35 by compositing the position 18A of the CCD camera 18 on the bird's-eye image Imt. At the same time, the navigation map Imn2 shown in FIG. 5B is configured by compositing the CAD data of the work piece 12 on the navigation map Imn1. Moreover, the CAD data is displayed in a dashed line herein (any easy-to-understand display method may be used instead of the dashed line) and a reference character R5 indicates a curvature. In addition, the navigation map Imn3 shown in FIG. 5C is configured by compositing a region where measurement of the work piece 12 by the CCD camera 18 is complete on the navigation map Imn1. Moreover, herein, for ease of display, a dashed line circle indicates a completed circle measurement (there is no particular requirement for the dashed line circle), and a circle with diagonal cross-hatching (which need not be diagonal lines) indicates a completed surface measurement. These display portions can be displayed in any desired colors, for example, in order to facilitate identification. In addition, the obtained navigation maps Mini to Imn3 are stored in the image memory 32, the HDD 38, or the RAM 40. In the display 25, switching between display of the navigation maps Imn1 to Imn3 (FIGS. 5A to 5C) and display of the measured image Imm (FIG. 5D) can be performed as appropriate using the keyboard 22, the joystick box 23, and the mouse 24. In particular, when the CCD camera 18 displaces over a wide area, display of the navigation maps Imn1 to Imn3 can be performed.

In this way, the bird's-eye navigation maps Imn1 to Imn3 are displayed on the display 25 and, at those times, the position 18A of the CCD camera 18 is also displayed. Thereby, without looking away from the display 25, an operator can intuitively understand the position 18A of the CCD camera 18 with respect to the entire work piece 12. Therefore, the operator can intuitively and readily avoid a collision of the CCD camera 18 without visually monitoring actual movement of the CCD camera 18.

At that point, in the present embodiment, the CAD data of the work piece 12 is composited on the navigation map Imn2, and thus approximate dimensions can be imaged for the operator. In other words, the operator is able to qualitatively understand a sense of distance on the bird's-eye image Imt. Therefore, improvements in usability during manual measurement and in reliability during measurement observation can be anticipated.

In addition, in the present embodiment, the region where measurement of the work piece 12 by the CCD camera 18 is completed is composited on the navigation map Imn3, and thus the operator can understand at a glance a measurement status with respect to the entire work piece 12.

At that point, placement of the work piece 12 on the measurement table 13 can be understood not with design data but on a physical basis, and thus safety of an operation can be improved. In addition, the operator can intuitively grasp over what range on the measurement table 13 measurement (displacement) is occurring, and thus operability can also be improved.

Therefore, in the present embodiment, intuitive understanding of the position 18A of the CCD camera 18 with respect to the work piece 12 is possible. Accordingly, safe operation of the CCD camera 18 can be ensured, and operability can be improved.

Moreover, in the present embodiment, three navigation maps Mini to Imn3 are configured separately and displayed separately. Thereby, a nature of the CAD data and a nature of the region where measurement has ended can be readily identified. However, a single navigation map may also be displayed on the display 25, the nature of the CAD data and the nature of the region where measurement has ended being composited on the navigation map.

A description of the present invention was given with the first embodiment; however, the present invention is not limited to this embodiment. In other words, improvements and design modifications can, of course, be made to the present invention without departing from the scope of the invention.

For example, in the first embodiment, one wide angle surveillance camera 19 was provided, which was displaced together with the CCD camera 18, and the navigation maps Imn1 to Imn3 displayed on the display 25 were altered accompanying the displacement of the wide angle surveillance camera 19. However, the present invention is not limited to this. For example, a navigation map displayed on a display may be a still image of a single specific location.

Figure 6:
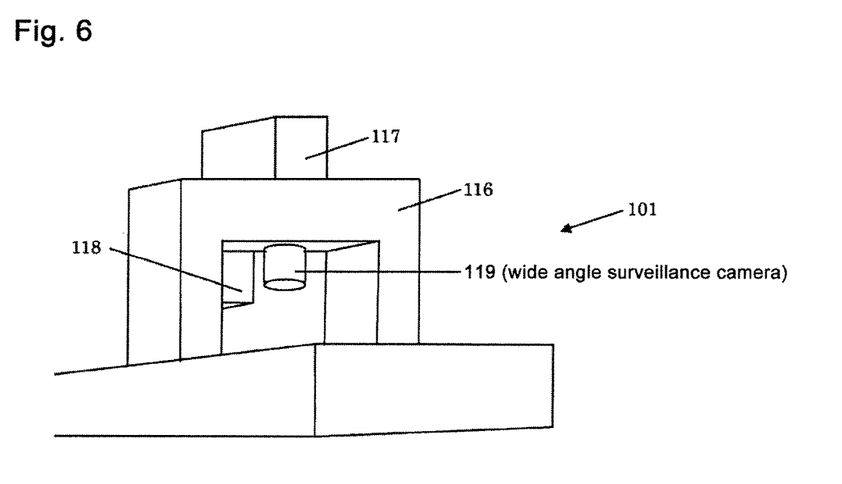
FIG. 6 is a schematic diagram illustrating a configuration of an orthogonal state measuring device according to a second embodiment of the present invention.

In addition, as in a second embodiment shown in FIG. 6, a wide angle surveillance camera 119 may be separated from a CCD camera 118 and fixated to an X-axis guide 116 (other configurations are identical to those of the first embodiment, and thus a description thereof is omitted). In other words, a navigation map can be configured to not displace in the X and Z directions. In addition, the present invention is not limited to a single wide angle surveillance camera and may instead include several, each of which captures one image then combines the obtained image data in order to obtain a bird's-eye image.

In addition, in the first embodiment, the CAD data of the work piece 12 was composited on the navigation map Imn2. However, the present invention is not limited to this. For example, the CAD data may be displayed on the display without being composited, separately from the navigation map Imn1, or the CAD data may be undisplayed.

In addition, in the first embodiment, the region where measurement of the work piece 12 by the CCD camera 18 was complete was composited on the navigation map Imn3.

However, the present invention is not limited to this. For example, a region where measurement of a work piece is complete may be displayed on a display without being composited, separately from the navigation map Imn1, or the region where measurement of the work piece is complete may be undisplayed.

Figure 7:
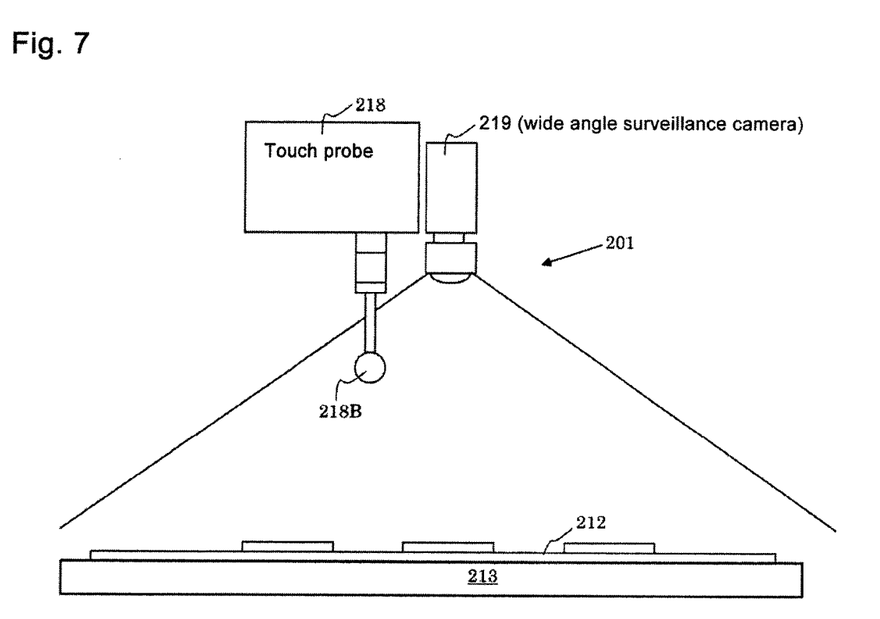
FIG. 7 is a schematic diagram illustrating a configuration of an orthogonal state measuring device according to a third embodiment of the present invention.

In addition, in the above embodiment, a stylus head was non-contact and was a CCD camera for measuring an image. However, the present invention is not limited to this. As in a third embodiment shown in FIG. 7, a stylus head may be configured as a contact-type touch probe 218 having a stylus 218B on a forefront end thereof (other configurations are identical to those of the first embodiment, and thus a description thereof is omitted).

Figure 8:
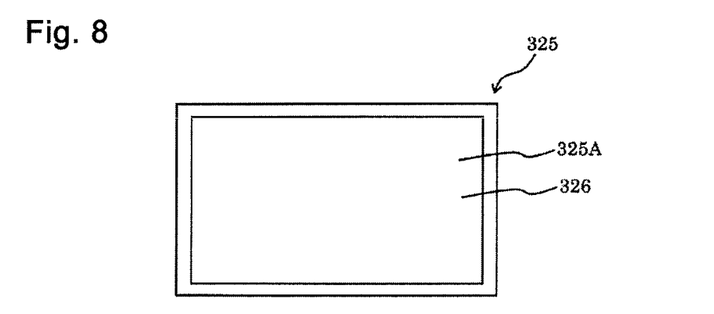
FIG. 8 is a schematic diagram illustrating a display according to a fourth embodiment of the present invention.

In addition, in the first embodiment, the keyboard 22, the joystick box 23, and the mouse 24 were used as the inputter. However, the present invention is not limited to this. As in a fourth embodiment shown in FIG. 8, a touch panel 326 may be installed in a screen 325A of a display 325 as an inputter (other configurations are identical to those of the first embodiment, and thus a description thereof is omitted). In such a case, menu selection or instruction of an edge detection position can be made using the touch panel 326 without employing a mouse, thereby offering potential for improvement in operability while making a device more compact.

Figure 9:
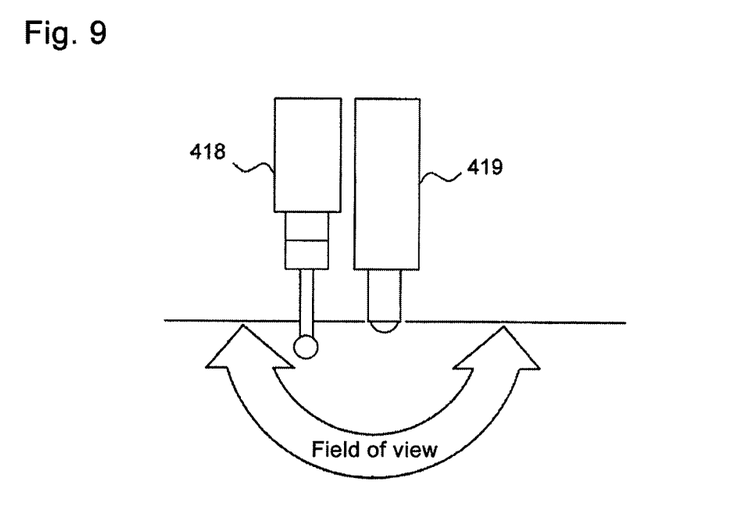
FIG. 9 is a schematic diagram illustrating a configuration of an orthogonal state measuring device according to a fifth embodiment of the present invention.
Figure 10A:
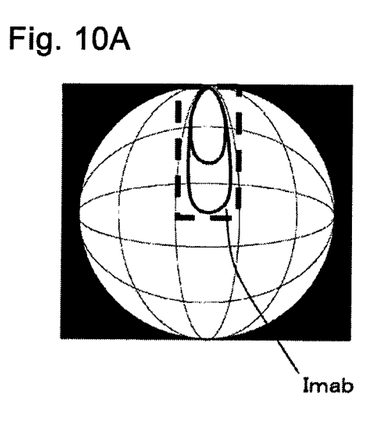
FIGS. 10A and 10B are schematic diagrams describing aberration correction performed in a processor of the orthogonal state measuring device of FIG. 9.
Figure 10B:
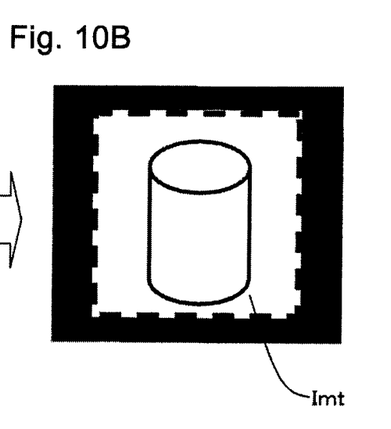

In addition, in the first embodiment, the wide angle surveillance camera 19 was envisioned as including chiefly a fish-eye lens. However, the present invention is not limited to this. For example, as in a fifth embodiment shown in FIGS. 9, 10A, and 10B, a wide angle surveillance camera (half/full circumference camera) 419 may be used having a bore-hole camera lens installed therein. In such a case, with respect to the total image Imab captured by the wide angle surveillance camera 419, an image of a desired field of view (e.g., a field of view in a displacement direction of a touch probe 418) only (or of the entire field of view) is aberration corrected to generate the bird's-eye image Imt. Then, a navigation map Imn may be configured from the bird's-eye image Imt and displayed on a real-time display (other configurations are identical to those of the first embodiment, and thus a description thereof is omitted).

Moreover, in the above embodiments, a wide angle surveillance camera is used having the above-noted characteristics. Thus, security of operation can be ensured and intensive practice operating the device can be made unnecessary as compared to a camera for surveillance (surveillance camera) having a normal field of view being provided separately from a stylus head, then operating the stylus head in the image and within a limited field of view from one direction.

The present invention can be applied to a broad range of orthogonal state measuring devices moving a stylus head such as a CCD camera or touch probe in X, Y, and Z directions with respect to a work piece.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An orthogonal state measuring device comprising:
   a measurement table;
   a stylus head configured to be displaced in X, Y, and Z directions relative to the measurement table and further configured to measure a work piece to be measured that is placed on the measurement table;
   a wide angle surveillance camera configured to move together with the stylus head, the wide angle surveillance camera further configured to capture in a single pass a total image having distortions and that is arrangeable into a flat aerial image of the work piece, the aerial image encompassing an entire field over which the stylus head is capable of relative displacement;
   a processor configured to:
      correct the distortions in the total image and generate the aerial image based on the total image;
      define a position of the stylus head on the aerial image; and
      generate a flat aerial navigation map in which the position of the stylus head is composited with the aerial image; and
   a display configured to display the navigation map.

2. The orthogonal state measuring device according to claim 1, wherein Computer Aided Design (CAD) data of the work piece is composited with the navigation map.

3. The orthogonal state measuring device according claim 1, wherein a region where measurement of the work piece by the stylus head is complete is composited with the navigation map.

4. The orthogonal state measuring device according claim 2, wherein a region where measurement of the work piece by the stylus head is complete is composited with the navigation map.

5. The orthogonal state measuring device according claim 1, wherein the wide angle surveillance camera has a focus distance of less than 24 mm and has a field angle of 90 degrees or more.

6. The orthogonal state measuring device according claim 5, wherein the wide angle surveillance camera has a field angle of 180 degrees or more.

7. The orthogonal state measuring device according claim 1, wherein the display includes a flat display screen.

8. The orthogonal state measuring device according claim 1, wherein a distance between the wide angle surveillance camera and the work piece is less than or equal to a distance between stylus head and the work piece.

9. The orthogonal state measuring device according claim 1, wherein the processor corrects the distortions in the total image by performing coordinate substitution of a position of each pixel data configuring the total image data.

10. The orthogonal state measuring device according claim 9, wherein the coordinate substitution comprises capturing with the wide angle surveillance camera, a lattice pattern as a distorted reference image ahead of time, from a candidate virtual position.

11. The orthogonal state measuring device according claim 10, wherein the processor further corrects the distortions in the total image by:
  obtaining a coordinate transformation coefficient from the captured distorted reference image that was obtained; and
  performing a coordinate transform on the total image data.

* * * * *